United States Patent
Shank et al.

[15] 3,640,844
[45] Feb. 8, 1972

[54] POWER-FLATTENED SEED-BLANKET REACTOR CORE

[72] Inventors: Richard C. Shank, Clairton; Carl E. Zucker; David H. Jones; Harry F. Raab, Jr., all of Pittsburgh; Robert T. Bayard, Bethel Park, all of Pa.

[73] Assignee: The United States of America as represented by the U.S. Atomic Energy Commission

[22] Filed: Nov. 7, 1969

[21] Appl. No.: 874,735

[52] U.S. Cl. ................................................. 176/18
[51] Int. Cl. ............................................... G21c 1/06
[58] Field of Search ............................ 176/17, 18, 40

[56] References Cited

UNITED STATES PATENTS

| | | |
|---|---|---|
| 3,335,060 | 8/1967 | Diener .......................... 176/17 X |
| 3,351,532 | 11/1967 | Raab, Jr. et al. ................ 176/17 |
| 3,338,790 | 8/1967 | Ackroyd et al. ................ 176/18 |
| 3,432,389 | 3/1969 | Stern ............................ 176/40 |
| 3,158,543 | 11/1964 | Sherman et al. ................ 176/17 |
| 3,252,867 | 5/1966 | Conley ......................... 176/18 |
| 3,341,420 | 9/1967 | Sevy ............................ 176/18 |

Primary Examiner—Carl D. Quarforth
Assistant Examiner—Harvey E. Behrend
Attorney—Roland A. Anderson

[57] ABSTRACT

A seed-blanket breeder reactor core having a flattened power density distribution resulting from selective loading of fissile material in the reactor core to achieve a desired radial reactivity distribution. The seed geometry of fuel modules near the periphery of the core is altered so that their reactivity worth is greater than centrally located fuel modules. The increased reactivity of the peripheral modules causes the gross power distribution in the core to flatten.

4 Claims, 6 Drawing Figures

3,640,844

INVENTORS.
Richard C. Shank
Carl E. Zucker
David H. Jones
Harry F. Raab, Jr.
BY Robert T. Bayard

ATTORNEY.

PATENTED FEB 8 1972 3,640,844

INVENTORS.
Richard C. Shank
Carl E. Zucker
David H. Jones
Harry F. Raab, Jr.
BY Robert T. Bayard

ATTORNEY.

POWER-FLATTENED SEED-BLANKET REACTOR CORE

BACKGROUND OF THE INVENTION

The invention described herein was made in the course of, or under, Contract AT-11-1-GEN-14 with the United States Atomic Energy Commission.

This invention relates to flattening the power density distribution over a nuclear reactor core and more particularly to flattening the power density distribution over the core of a seed-blanket-type breeder reactor by altering the seed geometry of the peripheral fuel modules.

The following terms will be used in describing the invention:

Fissile material—The term will be used to designate material which fissions upon the absorption of a thermal neutron.

Fertile material—The term will be used to designate material which transforms into fissile material upon the capture of neutrons.

Neutron multiplication, K,—The term will be used to designate the ratio of the number of neutrons present at a given time to the number present one generation earlier.

Fuel—The term will be used to designate either fissile or fertile material or a combination of both, within the reactor core.

Seed region—The term will be used to designate a region formed by nuclear fuel wherein the primary activity is the fissioning of fissile material.

Blanket region—The term will be used to designate a region formed by nuclear fuel wherein the primary activity is the transforming of fertile material to fissile material.

Neutron flux—The term will be used to designate the number of neutrons passing through a unit area per unit time.

Power density—The term will be used to designate the power generation per unit volume of a nuclear reactor core.

Seed geometry—The term will be used to designate the physical configuration of fuel elements in the seed region.

Blanket geometry—The term will be used to designate the physical configuration of the fuel elements in the blanket region.

A breeder reactor increases the fissile material inventory over core lifetime while concurrently producing power. When fission occurs, neutrons and energy are emitted. The fissile material inventory in a breeder reactor is increased when fertile material such as thorium-232 absorbs neutrons emitted during the fission process. When an atom of thiorium-232 captures a neutron, it becomes thorium-233 which radioactively decays emitting beta particles to protactinium-233. Protactinium-233 radioactively decays emitting beta particles to uranium-233, a fissile material. The chief source of neutrons for absorption by the fertile material is the fissioning of fissile fuel. A minor source of neutrons is the fast fissioning of nonfissile material such as thorium-232 and protactinium-233. Of the net number of neutrons produced for each atom of fissile material destroyed, one neutron must be subsequently absorbed in the fissile material to sustain the chain reaction and keep the reactor critical. Concurrently, the fertile material must absorb at least one additional neutron to replace the fissile atom destroyed if breeding is to be accomplished. It is therefor necessary that the ratio of neutron production from fissions per neutron absorption in fissile material be greater than 2.0 if breeding is to take place. Furthermore, it is necessary for this ratio to be sufficiently greater than 2.0 to account for neutrons lost through parasitic capture (the absorption of a neutron that does not result in a fission) by moderator, structure, fission products and impurities in the fuel. Uranium-233, cooled and moderated by light water, is a material wherein the ratio of neutron production per thermal neutron absorption is greater than 2.0.

Initially, the seed region in a seed-blanket breeder reactor contains sufficient quantities of fissile material to insure that the primary activity in the region is the fissioning of the fissile material. Prior art seed-blanket breeder reactors have provided self-sustained breeding with a seed region fueled with uranium-233 and a blanket region fueled with thorium-232. The thorium-232-uranium-233 fuel element arrays were contained in seed-blanket modular fuel units. Several of these modules in an assembled array comprised the reactor core. Often, the several modular units that comprised the core were surrounded by a natural thoria reflector blanket. U.S. Pat. No. 3,351,532 to H. F. Raab, Jr. et al. typifies this approach. Also, breeder reactors have provided self-sustaining breeding when the blanket region was fueled with some fissile U-233 in addition to the thorium.

An important consideration in nuclear reactor design is the power density distribution in the core throughout core lifetime. A reactor core fueled with a plurality of identical fuel modules, i.e., fuel modules of identical size and shape having the same fissile-fuel composition, would be initially characterized by an overall flux and power shape which could be approximated by $J_o$ where $J_o$ represents over a large portion of the core the distribution of the zero order Bessel function of the first kind. Thus, the highest power density would tend to occur at the center of the core and decrease radially to a minimum at the core periphery. Further, this distribution would generally change over the lifetime of the core. It is desirable to minimize the variations in power density throughout the core and to obtain an even sharing of power among the modules throughout core lifetime. For the power distribution across the core to be as uniform as possible the ratio of maximum power output to average power output should be close to unity. Balancing the power among the modules in the core is known as radial power-flattening. A flat power distribution that is maintained throughout core lifetime is desirable because it results in a more even burnup of the nuclear fuel, and hence, a more uniform burden on the fuel elements in the core. Also, when the power distribution in the core is flat, the flow required to cool the reactor can be more uniform. And finally, a more uniform power distribution results in lower power costs because the core size for a given power output is minimized and the average energy output of the fuel elements is maximized without exceeding maximum fuel depletion limits.

A flat power distribution is also important in the core of a breeder reactor, such as a light water breeder reactor, since neutron absorptions by protactinium-233 and xenon-135 reduce the breeding performance of the core. Unlike other parasitic absorbers, the effect of protactinium-233 and xenon-135 on conversion ratio (the number of fissionable atoms produced per fissionable atom destroyed in a breeder nuclear reactor) is a function of neutron flux level and neutron flux is proportional to power density. The power rating of the core consistent with good breeding performance can be enhanced by power flattening if this is accomplished by flux flattening since neutron losses to protactinium-233 and xenon-135 are minimized.

Prior art approaches to power density flattening have included radially varying the fissile fuel composition from the center of the core to the core periphery. Fuel of lower enrichment (number of fissile atoms available per unit volume) is used in the center of the core where the power density would ordinarily be highest. The fuel enrichment radially increases toward the core periphery where the power density would ordinarily be lowest. This raises the problem of increasing the number of fuel elements having specially tailored loadings. A further problem with conventional radial fuel zoning is that large amounts of uranium-233 must be added to the reactor core in order to achieve a relatively flat power density distribution. The excessive amounts of uranium-233 that must be expended makes conventional radial fuel zoning inefficient. Another technique, described in U.S. Pat. No. 3,341,426 to C. P. Gratton et al., is to use neutron absorbers in those regions of the core where peaks in the power density distribution occur. But this approach is deleterious to breeding since it involves a deliberate loss of neutrons. Another prior art method, described in U.S. Pat. No. 3,267,001 to P. Greebler, arranges the neutron reflector material, fissile fuel material and blanket fuel material into specific zones to take advantage of the properties of the materials to provide a flat power density distribution over the fissile fuel portion of the core.

The seed-blanket breeder reactor described in U.S. Pat. No. 3,351,532 to H. F. Raab, Jr. et al. and U.S. Pat. No. 3,335,060 to R. L. Diener, provides for control of the reactivity level of the core by movement of a portion of the nuclear fuel in each fuel module. The movable fuel concept has potential for flattening the power density distribution in the core by moving the peripheral fuel modules to a higher, more reactive position than the centrally located fuel modules. It has been demonstrated by analysis of a seed-blanket breeder reactor fueled with uranium-233 and thorium-232 and 15 feet in diameter and 8 feet in height that a relatively flat power density distribution could be achieved by varying the positions of the movable fuel in the inner and outer fuel modules in the range 0.5 to 1.0 feet. This amount of misalignment is not optimum from the standpoint of breeding performance, reactivity worth, and core lifetime. This will be described in more detail below. The results of examining power flattening in a smaller core (8-foot diameter) for a seed-blanket-type breeder reactor indicated that selective positioning of the movable fuel was even less desirable than in the above-mentioned larger core. The difference in the movable fuel positions of the outer and centrally located fuel modules was in the range 1.5 to 2.5 feet. This difference in movable fuel positions has several disadvantages. The large difference in fuel positions results in increased neutron leakage from the core, thereby adversely affecting breeding performance. Further, an axially skewed power density distribution may result, thereby limiting thermal performance of the reactor. Also, as the core depletes, any unpredicted changes in the gross power distribution would have to be controlled by further adjustment of the movable fuel positions. And further, a large difference in movable fuel position at the beginning of life does not permit sufficient flexibility for control throughout core lifetime. Thus, it can be seen that movable fuel misalignment to achieve power flattening is undesirable because of the loss in reactor performance.

Accordingly, it is an object of the invention described herein to provide more effective flattening of the power density distribution in the core of a seed-blanket reactor with movable fuel control than can be achieved by movable fuel misalignment.

It is a further object of this invention to provide a more efficient power flattening than is achieved by conventional radial fuel zoning.

It is a further object of this invention to provide power flattening that results in a minimal leakage of neutrons from the core.

SUMMARY OF THE INVENTION

The invention described herein provides a seed-blanket breeder reactor core cooled and moderated by light water, surrounded by a reflector blanket and comprised of a plurality of fuel modules each having a movable assembly including a central seed region and a stationary assembly including an annular seed region and an annular blanket region, each of said fuel modules comprised of fuel elements with the same enrichment, the improvement comprising fuel modules around the periphery of the core having a greater reactivity worth than the centrally located fuel modules. The annular seed region thickness of the peripheral fuel modules is greater than the annular seed region thickness of the centrally located fuel modules thereby reducing local power gradients across the peripheral fuel modules and flattening the power density distribution.

BRIEF DESCRIPTION OF THE DRAWINGS

The invention will be more clearly understood from the following description and accompanying drawings wherein:

FIG. 5 is a vertical projection of FIG. 5a.

DESCRIPTION OF THE PREFERRED EMBODIMENT

Figure 1:
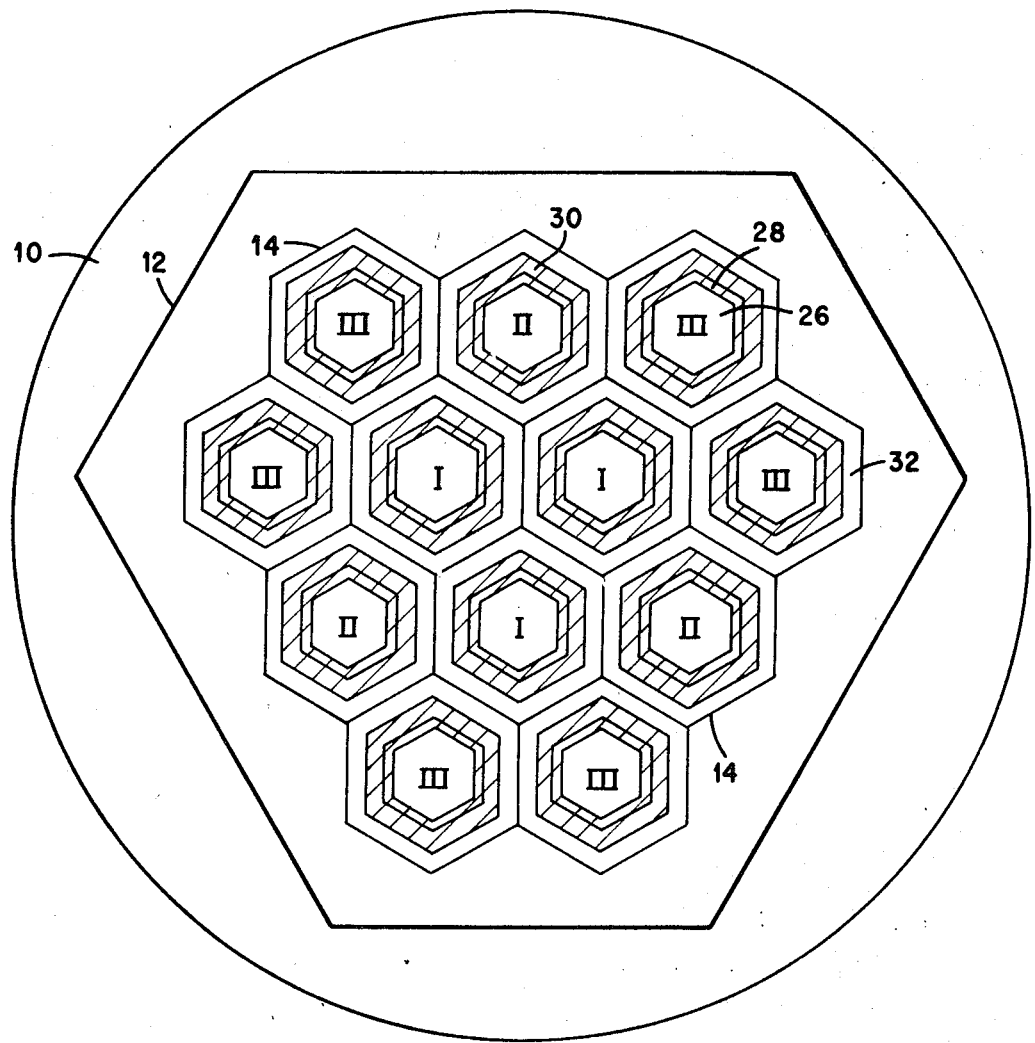
FIG. 1 is a horizontal sectional view through a 12-module seed-blanket breeder reactor core of the prior art employing no power-flattening technique.
Figure 5A:
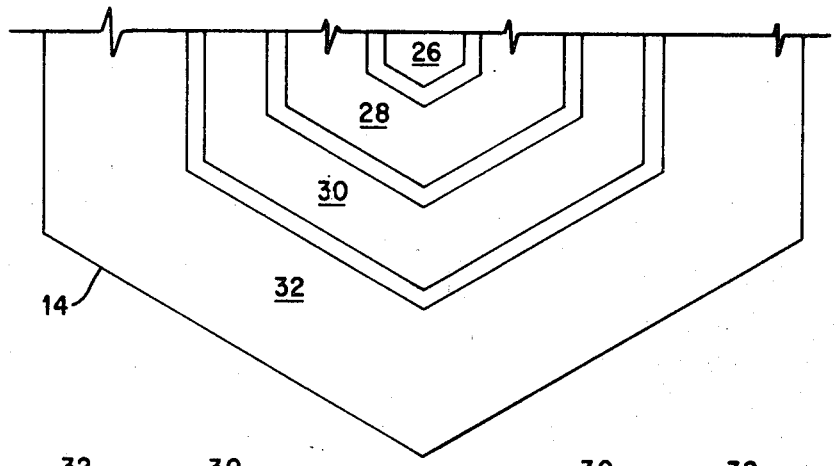
FIG. 5a is a horizontal axial section through a typical seed-blanket fuel module.
Figure 5:
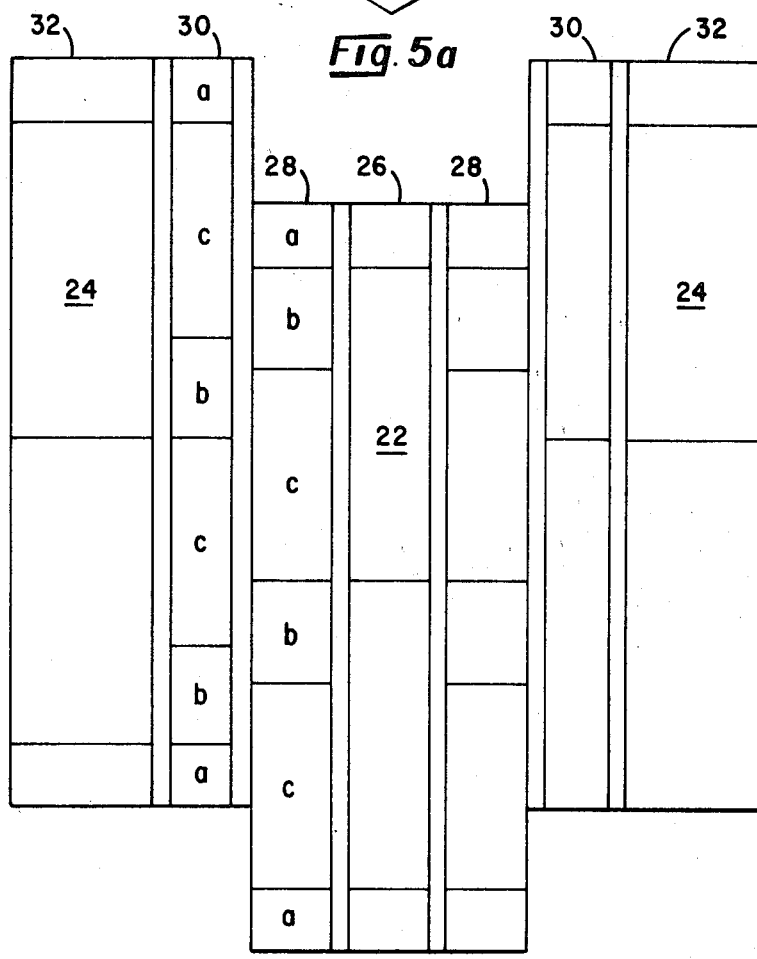

There are several different core designs which can be used for a light water breeder reactor core. To demonstrate the effectiveness of the invention described herein a 12-module core, 8 feet in diameter, has been chosen which employs a relatively widely spaced uranium-233 oxide bearing thoria blanket. The loose array of blanket fuel rods forming the blanket region of the core lessens hydraulic resistance to the coolant thereby providing a wet blanket region. FIG. 1 illustrates the 12-module breeder reactor core used to demonstrate the effectiveness of this invention. Reactor core 10 is cooled and moderated by light water and surrounded by reflector blanket 12. Reflector blanket 12 is composed of thoria-fueled rods (not shown) and captures neutrons which leak from the inner portion of core 10. The thickness of reflector blanket 12 is chosen so that the net radial leakage of neutrons from the core is consistent with the criterion of breeding in the reactor core. Each of the 12 hexagonally shaped fuel modules 14 is located in one of three regions in core 10. The three central fuel modules with no sides exposed to reflector blanket 12 are located in region I. The three fuel modules located along the periphery of core 10 with two sides exposed to reflector blanket 12 are in region II. The remaining six modules located around the periphery of core 10 with three sides exposed to reflector blanket 12 are located in region III. The reason for indicating the location of each of the fuel modules 14 as being in either regions I, II, or III will be discussed below. Furthermore, fuel modules located in region I will be designated as centrally located and fuel modules located in regions II and III will be designated as peripheral fuel modules. As illustrated in FIGS. 5 and 5a, each of the fuel modules 14 includes a central movable assembly 22 and an annular stationary assembly 24 surrounding movable assembly 22. Movable assembly 22 includes central blanket region 26 and central seed region 28, illustrated in FIGS. 1, 5, and 5a. Stationary assembly 24 includes annular seed region 30 and annular blanket region 32. Reactivity control in core 10 is achieved by vertical movement of movable assembly 22 within stationary assembly 24. An upward movement of movable assembly 22 will result in an increase in reactivity. Seed regions 28 and 30 are fueled with rods containing a mixture of uranium-233 oxide and thoria. As illustrated in FIG. 5, seed regions 28 and 30 are axially zoned, i.e., the fissile-fuel composition is axially varied in zones $a$, $b$, and $c$. Through axial zoning of seed regions 28 and 30 it is possible to achieve high reactivity variation and therefore a high degree of reactivity control. The metal-to-water ratio in core 10 is approximately 2.5. The blanket fuel rods (not shown) contain a mixture of uranium-233 oxide and thoria with the uranium-233 oxide comprising 0.5–1.0 weight percent in the preferred embodiment. As previously mentioned, the blanket rods are arranged in a relatively widely spaced array. Reflector blanket 12 surrounding the fuel modules is also comprised of widely spaced blanket rods.

The invention described herein relates to power flattening the power density distribution in a seed-blanket reactor core. To demonstrate the effectiveness of the invention, four cases will be analyzed.

CASE 1

In this case, illustrated in FIG. 1, the 12 fuel modules comprising core 10 are all identical, i.e., each of the fuel modules 14 is the same size and shape and fueled with elements of the same enrichment. The 12 fuel modules comprising core 10 in FIG. 1 would, therefore, be identical to the fuel module illustrated in FIGS. 5 and 5a. As previously mentioned, the gross power density distribution over most of a reactor core of identical fuel modules is a $J_o$ shape at the beginning of core life. The disadvantages of a $J_o$ power density distribution were discussed above. FIG. 1 therefore represents a prior art core for a seed-blanket reactor wherein there is no provision for flattening the power density distribution.

CASE 2

Figure 2:
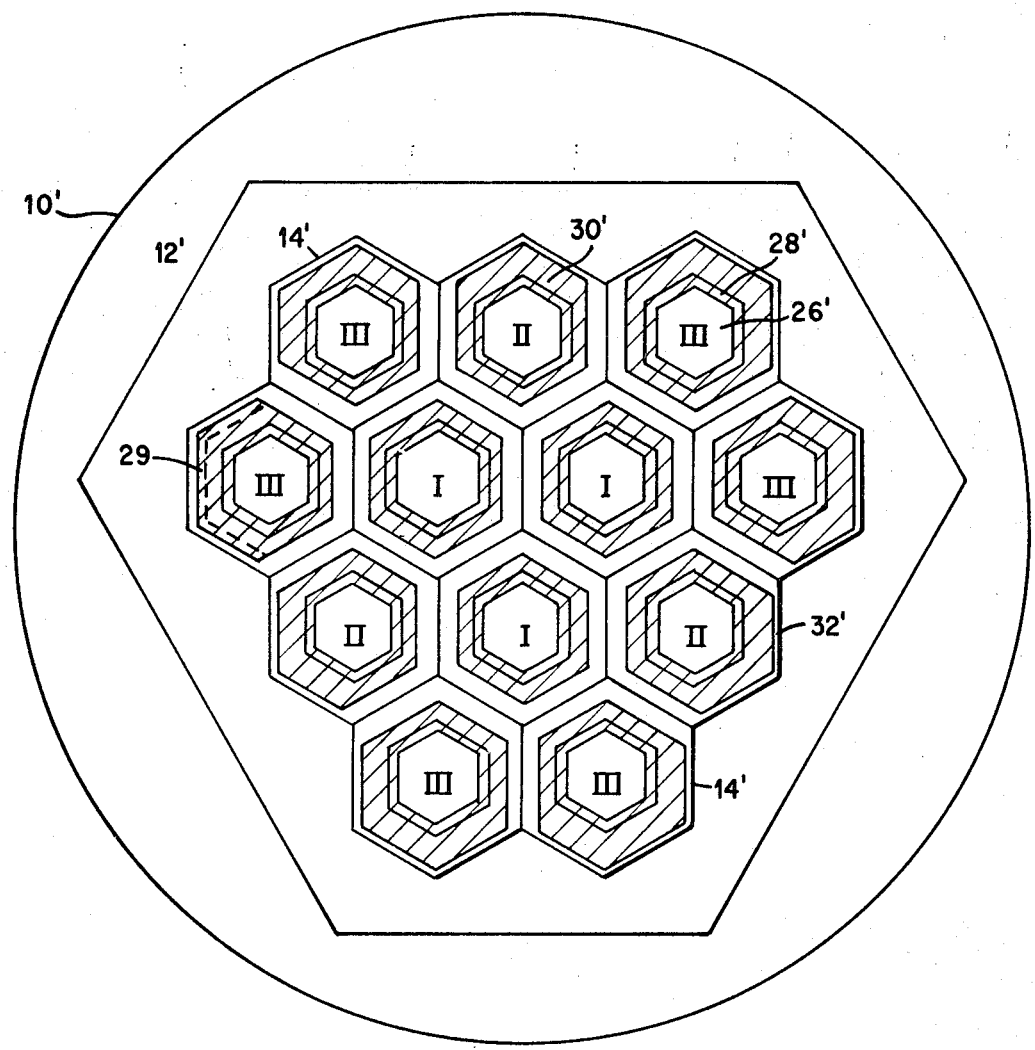
FIG. 2 is a horizontal sectional view through a 12-module seed-blanket breeder reactor core illustrating the increased annular seed region thickness of the peripheral fuel modules.

This is the subject invention and it is illustrated in FIG. 2. The geometry of annular seed region 30 in FIG. 1 in stationary assembly 24 is altered in each of the fuel modules 14 around the periphery of core 10 to allow additional seed rods to be loaded into the reactor core. The peripheral fuel modules are those which have sides exposed to reflector blanket 12. Mechanically, the alteration of seed region 30 in FIG. 1 in each of the peripheral fuel modules involves removing blanket rods in blanket region 32 along each side of peripheral fuel module 14 that is exposed to reflector blanket 12. The structural channel (not shown) separating seed region 30 and blanket region 32 is then moved toward decreased blanket region 32' in FIG. 2 and additional seed rods are loaded into the region formed by the vacated blanket rods thereby forming additional seed region 29 illustrated in FIG. 2. The dotted lines in the fuel module in FIG. 2 indicate the prior boundary of seed region 30. Prior seed region 30 and additional seed region 29 combine to form seed region 30' in FIG. 2. Each of the peripheral modules 14' in region III has additional seed added to the three sides exposed to reflector blanket 12'. Similarly, each of the peripheral fuel modules in region II has additional seed added to the two sides of the module exposed to reflector blanket 12'. As will be discussed in more detail below, the insertion of additional seed according to this invention results in a flattening of the power density distribution of Case 1.

CASE 3

Figure 3:
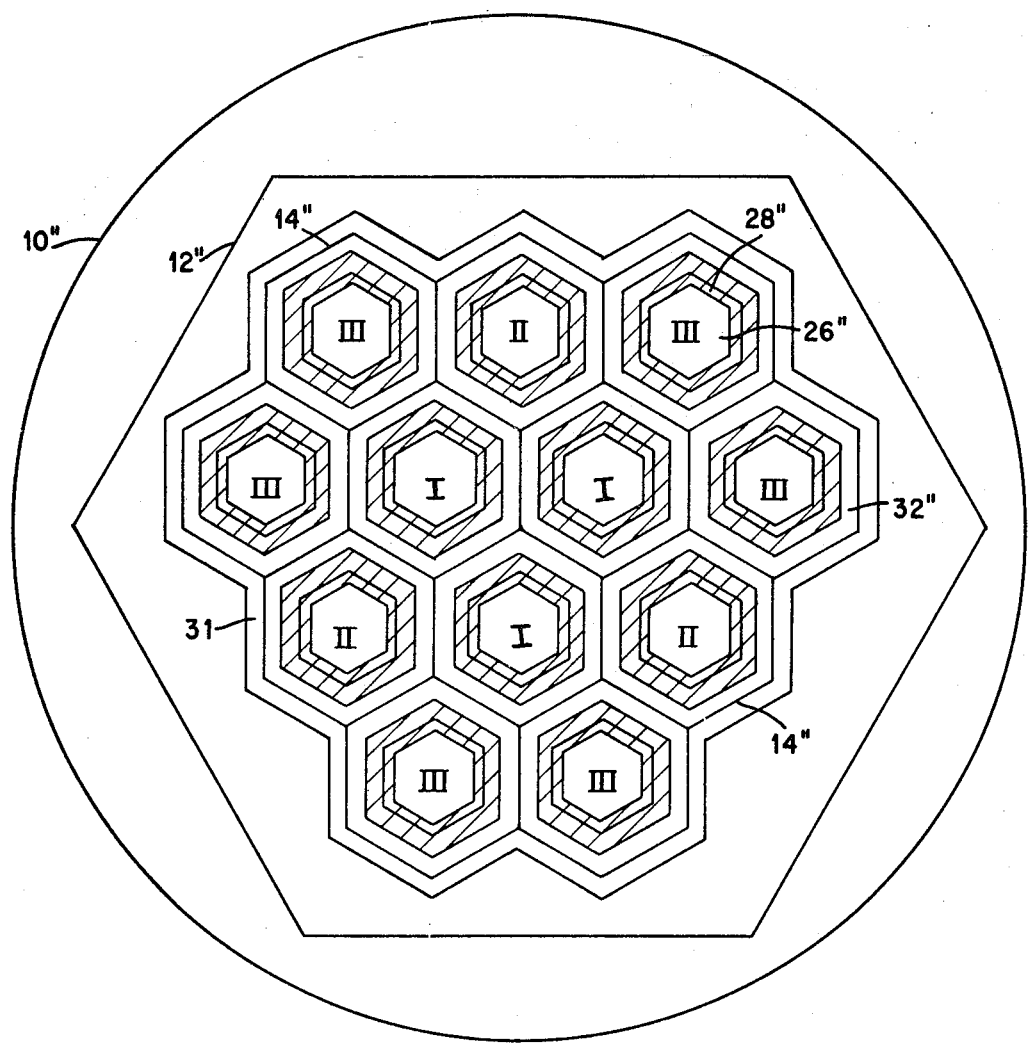
FIG. 3 is a horizontal sectional view through a 12-module seed-blanket breeder reactor core illustrating a uranium-bearing blanket encircling the peripheral fuel modules.

In this case, illustrated in FIG. 3, a ring of uranium-233 oxide bearing blanket fuel rods is placed around the peripheral fuel modules of core 10'' to form additional blanket region 31. Similar to previously mentioned blanket region 32 in core 10 (see FIG. 1), blanket region 32'' is comprised of fuel rods containing a mixture of uranium-233 oxide and thoria wherein the uranium-233 oxide comprises approximately 0.5–1.0 weight percent of the mixture. Additional blanket region 31, however, is comprised of fuel rods containing a mixture of uranium-233 oxide and thoria wherein the uranium-233 oxide comprises approximately 1.5 weight percent of the mixture. Mechanically, power flattening is accomplished by replacing the blanket rods in reflector blanket 12'' around the peripheral fuel modules which contain thoria with blanket rods containing the above-mentioned mixture of uranium-233 oxide and thoria. This approach to power flattening the power density distribution in a seed-blanket reactor is an extension of the conventional method of fuel zoning to achieve power flattening.

CASE 4

Figure 4:
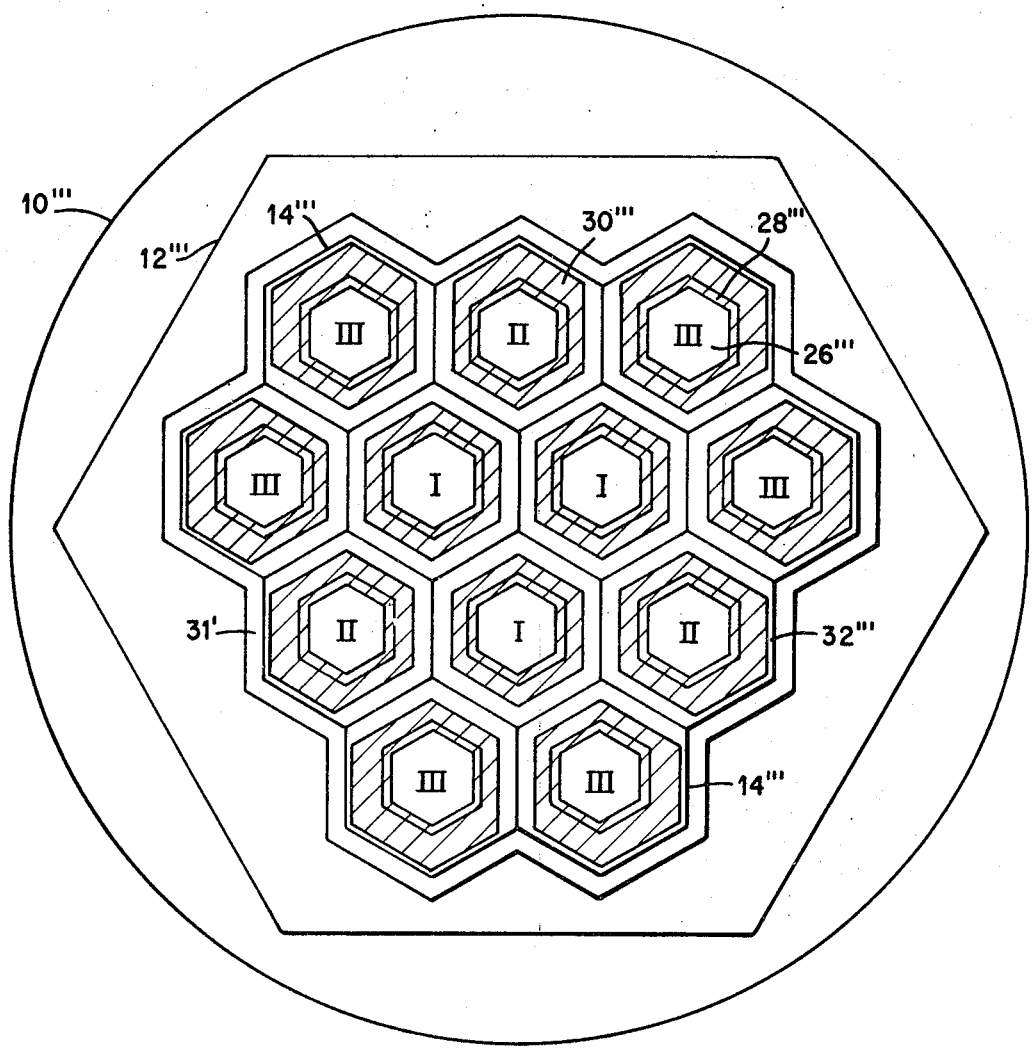
FIG. 4 is a horizontal sectional view through a 12-module seed-blanket breeder reactor core illustrating a uranium-bearing blanket encircling the peripheral fuel modules wherein the peripheral fuel modules have an increased annular seed region thickness.

This case, illustrated in FIG. 4, is a combination of the power-flattening techniques described in Cases 2 and 3— providing additional seed in the annular seed region and providing an enriched blanket around the periphery of the core. The power flattening achieved in Case 4 will be discussed below.

It should be appreciated that the power-flattening techniques described above in Cases 2, 3, and 4 can be carried out by initially selectively loading fuel into the various regions of the reactor core rather than altering an existing core as described above. As previously mentioned, the reason for describing the invention in terms of altering an existing core is to better demonstrate the effectiveness of the subject invention. Table I below describes the results of power flattening in the above-discussed cases. The core/cell factor is used to measure the degree of power flattening in the core. This factor is the ratio of local power density in a fuel module in the core to the power density in a core in which all modules operate at the same power density. When the core/cell factor is minimized and equalized in the various modules in the core, the power density distribution is considered to be flat. The superscripts I, II, and III in Table I refer to the geometrical location of the fuel modules in regions I, II, and III of the core as discussed above.

TABLE I.—RESULTS OF POWER-FLATTENING STUDIES FOR A 12-MODULE BREEDER DEMONSTRATION CORE

| Case | Description | I, core/cell | II, core/cell | III, core/cell | Kg. $U^{233}$ added |
|---|---|---|---|---|---|
| 1 | All modules critical no power flattening. | 1.82 | 1.38 | 0.99 | 0 |
| 2 | Power flatten, adding seed: | | | | |
| 2a | 1.2 in. extra seed | 1.50 | 1.25 | 1.00 | 27.1 |
| 2b | 1.8 in. extra seed | 1.34 | 1.17 | 0.98 | 41.2 |
| 3 | Power flatten, add slightly enriched blanket. | 1.42 | 1.24 | 1.05 | 82.8 |
| 4 | Power flatten, add extra seed and slightly enriched blanket. | 1.08 | 1.13 | 1.15 | 103.8 |

Table I indicates that a 12-module breeder reactor core with identical fuel modules (Case 1) and therefore no power flattening has a core/cell factor of 1.82 in the region I fuel modules. According to the subject invention (Case 2a), by adding 1.2 inches of additional fuel (27.1 kg. $U^{233}$) in the seed region of the peripheral fuel modules, the core/cell factor in region I fuel modules was reduced to 1.50. Furthermore, the core/cell factors in regions II and III were changed from 1.38 and 0.99 respectively in the nonpower-flattened core to 1.25 and 1.00 respectively by the subject invention. The average core/cell factor for Case 1 is 1.37 while the average core/cell factor resulting from the invention is 1.25. As previously mentioned, when the core/cell factor is minimized and equalized in the various fuel modules of the core, the power density distribution is considered to be flat. The results obtained by the method of the subject invention are more dramatically demonstrated in Case 2b where 1.8 inches of additional fuel (41.2 kg. $U^{233}$) is added to the peripheral fuel modules. The resultant average core/cell factor is 1.13. The core/cell factor could be lowered much more by adding additional seed material, but the effect of this additional fuel on core shutdown properties might be detrimental. The results of power flattening by adding a blanket containing uranium-233 around the periphery of the outer fuel modules (Case 3) indicate that 82.8 kg. of uranium-233 must be added around the core to obtain an average core/cell factor of 1.23. Though this represents approximately the same average core/cell factor achieved in Case 2a, 55.7 kg. of additional uranium-233 are required to achieve the result. Thus, power flattening according to the subject invention saves approximately 55.7 kg. of uranium-233 and neutron leakage is minimized substantially. It is therefore possible to achieve maximum power flattening with a minimum expense of uranium-233 by the subject invention. Case 4, which employed the subject invention (Case 2) plus a small amount of radial zoning of the blanket fuel outside the peripheral seed modules, resulted in a significant reduction in the core/cell factor. The peak core/cell value of 1.15 occurs at the interface between the blanket fuel zones. The radial neutron leakage for this core is 0.3 percent. Comparing Cases 3 and 4, the peak core/cell value in Case 3, 1.42, can be reduced to 1.15 in Case 4 by the addition of approximately 20 kg. of uranium-233 according to the subject invention.

It should be pointed out that the power flattening accorded to the subject invention can be similarly employed in a core with a closely spaced thoria fueled blanket instead of the relatively widely spaced uranium-233 fueled blanket of the preferred embodiment. Furthermore, the subject invention can be employed in fuel modules that do not have axial fuel zoning in the seed regions, as in the preferred embodiment. For example, the invention could be used in conjunction with the thoria blanket stepped control module discussed in U.S. Pat. No. 3,335,060 to R. L. Diener. This invention can also be employed in cores with cylindrical seed regions instead of the hexagonal seed regions of the preferred embodiment. This would be accomplished by increasing the seed thickness on the side near the periphery of the core relative to the side nearer the central modules. And similar to Case 4, the blanket reactivity may be altered by changing the fissile fuel content near the periphery of the core relative to that in the center of the core. Furthermore, this invention is not limited to small seed-blanket cores as in the preferred embodiment. It can be applied to seed-blanket reactors in general, regardless of size.

The novelty of this invention lies in the deliberate building in of a nonuniform reactivity distribution in the fabrication of the seed-blanket assemblies. The increased reactivity of the peripheral modules causes the gross power distribution in the core to shift away from the center of the core. Increasing the thickness of the seed near the periphery of the core also reduces the local power gradients across these outer modules. In the power-flattened core the shutdown properties are nearly uniform among the modules and are similar to the shutdown properties of the central modules in an unflattened core. Power flattening consistent with good breeding performance and adequate core shutdown properties can be achieved with the invention described herein. Furthermore, this invention is much more efficient than conventional radial fuel zoning to achieve the same degree of power flattening in a seed-blanket breeder reactor core.

While a particular embodiment of the invention has been illustrated and described, modifications will become apparent to those skilled in the art, and it is intended to cover in the appended claims all such modifications which come within the scope of this invention.

What is claimed is:

1. In a seed-blanket breeder reactor core cooled and moderated by light water, surrounded by a reflector blanket and comprised of a plurality of fuel modules each having a central, axially movable assembly including a seed region, and an outer stationary assembly including an annular seed region surrounded by an annular blanket region, said fuel modules comprised of seed fuel elements with identical enrichment and blanket fuel elements with identical enrichment, the improvement comprising the annular seed region of each of the fuel modules around the periphery of the core having sides facing the reflector blanket thicker than sides facing other fuel modules and thicker than sides of the annular seed region of the centrally located fuel modules.

2. The improvement of claim 1 wherein the annular seed region thickness of said peripheral fuel modules is 1.2 to 1.8 inches greater than the annular seed region thickness of the centrally located fuel modules.

3. The improvement of claim 1 further comprising a uranium-233 oxide bearing thoria blanket surrounding the peripheral fuel modules.

4. The improvement of claim 3 wherein said uranium-233 oxide bearing thoria blanket comprises 1.5 weight percent of uranium-233 oxide.

* * * * *